United States Patent [19]

Gavalas et al.

[11] Patent Number: 4,902,307
[45] Date of Patent: Feb. 20, 1990

[54] SYNTHESIS OF SIO₂ MEMBRANE ON POROUS SUPPORT AND METHOD OF USE OF SAME

[75] Inventors: George R. Gavalas, Altadena, Calif.; Constantin E. Megiris, Eemnes, Netherlands

[73] Assignee: California Institute of Technology, Pasadena, Calif.

[21] Appl. No.: 273,241

[22] Filed: Nov. 18, 1988

[51] Int. Cl.⁴ .............................................. B01D 53/22
[52] U.S. Cl. .......................................... 55/16; 55/158; 55/522; 65/30.13
[58] Field of Search .......................... 55/16, 158, 522; 65/3.15, 30.1, 30.13, 30.14

[56] References Cited

U.S. PATENT DOCUMENTS

| | | | |
|---|---|---|---|
| 1,685,759 | 9/1928 | Walter | 55/16 X |
| 2,892,508 | 6/1959 | Kohman et al. | 55/16 |
| 3,019,853 | 2/1962 | Kohman et al. | 55/16 |
| 3,100,868 | 8/1963 | McAfee, Jr. | 55/16 X |
| 3,135,591 | 6/1964 | Jones | 55/16 |
| 3,338,681 | 8/1967 | Kordesch | 55/158 X |
| 3,450,500 | 6/1969 | Setzer et al. | 55/16 X |
| 3,567,666 | 3/1971 | Berger | 55/158 X |
| 3,717,525 | 2/1973 | Bültemann | 55/158 X |
| 3,957,559 | 5/1976 | Hoffman, Jr. | 55/158 X |
| 4,313,013 | 1/1982 | Harris | 55/16 X |
| 4,599,157 | 7/1986 | Suzuki et al. | 55/158 X |
| 4,627,859 | 12/1986 | Zupancic et al. | 55/158 |
| 4,670,033 | 6/1987 | Miura | 65/30.13 X |
| 4,806,189 | 2/1989 | Kraus et al. | 55/158 X |
| 4,810,485 | 3/1989 | Marianowski et al. | 55/158 X |
| 4,828,588 | 5/1989 | Hwang et al. | 55/158 |

FOREIGN PATENT DOCUMENTS

| | | | |
|---|---|---|---|
| 3421833 | 10/1985 | Fed. Rep. of Germany | 55/158 |
| 55-119420 | 9/1980 | Japan | 55/16 |
| 57-150423 | 9/1982 | Japan | 55/158 |
| 59-055314 | 3/1984 | Japan | 55/158 |
| 59-055315 | 3/1984 | Japan | 55/158 |
| 61-002548 | 1/1986 | Japan | 55/158 |
| 61-238303 | 10/1986 | Japan | 55/158 |
| 63-049220 | 3/1988 | Japan | 55/158 |
| 63-088019 | 4/1988 | Japan | 55/158 |
| 2190397 | 11/1987 | United Kingdom | |

OTHER PUBLICATIONS

R. R. McCaffrey et al., "Inorganic Membrane Technology", Separation Science and Technology, 22(2&3), 873–887, 1987.

Y. Shindo et al, "Separation of Gases By Means of a Porous Glass Membrane at High Temperatures", J. of Chem. Eng. of Japan, vol. 17, No. 6, 1984, 850-852.

K. Haraya et al., "Gas Separation by Means of a Porous Membrane with Cocurrent and Countercurrent Flows", J. of Chem. Eng. of Japan, vol. 19, No. 5, 1986, 461-464.

Y. Shindo et al, "Separation of Three-Component Gas . . . Flow", J. of Chem. Eng. of Japan, vol. 18, No. 6, 1985, 485-489.

K. Haraya et al., "Separation of H₂-CO Mixtures with Porous Glass Membranes in the Intermediate Flow Region", J. of Chem. Eng. of Japan, vol. 19, No. 3, 1986, 186-190.

Y. Shindo et al., "Gas Diffusion in Microporous Media in Knudsen's Regime", J. of Chem. Eng. of Japan, vol. 16, No. 2, 1983, 120-126.

"Possibility for Effective Production of Hydrogen from Hydrogen Sulfide by Means of a Porous Vycor Glass Membrane", Ind. Eng. Chem. Fundam. 1981, 20, 97-99.

T. Kameyama et al, "Production of Hydrogen from Hydrogen Sulfide by Means of Selective Diffusion Membranes", Hydrogen Energy Arog., vol. 2 (1981), 569-579.

K. Fukuda et al., "Catalytic Decomposition of Hydrogen Sulfide", Ind. Eng. Chem. Fundam, vol. 17, No. 4, 1978, 243-248.

M. Carolan et al., "Chemical Vapor Deposition of Yttria Stabilized Zirconia", Solid State Ionics 25 (1987) 207-216, North-Holland, Amsterdam.

Primary Examiner—Robert Spitzer
Attorney, Agent, or Firm—Ashen Golant Martin & Seldon

[57] ABSTRACT

A method for lining a porous tube (5) with a film (11) of SiO₂ is described. The treated tube may be used to separate hydrogen from reaction mixtures such as those resulting from the water-gas shift reaction or the catalytic decomposition of hydrogen sulfide.

14 Claims, 2 Drawing Sheets

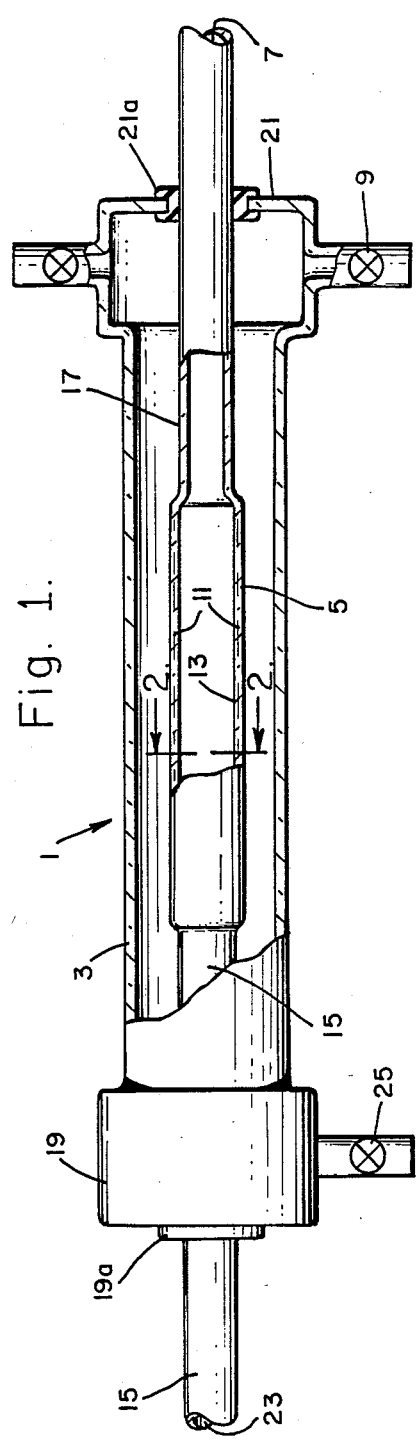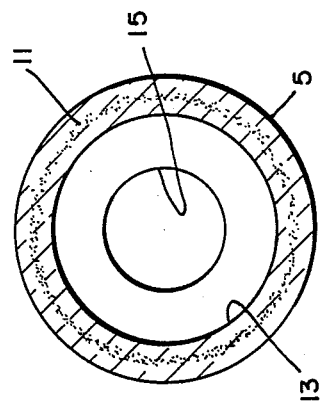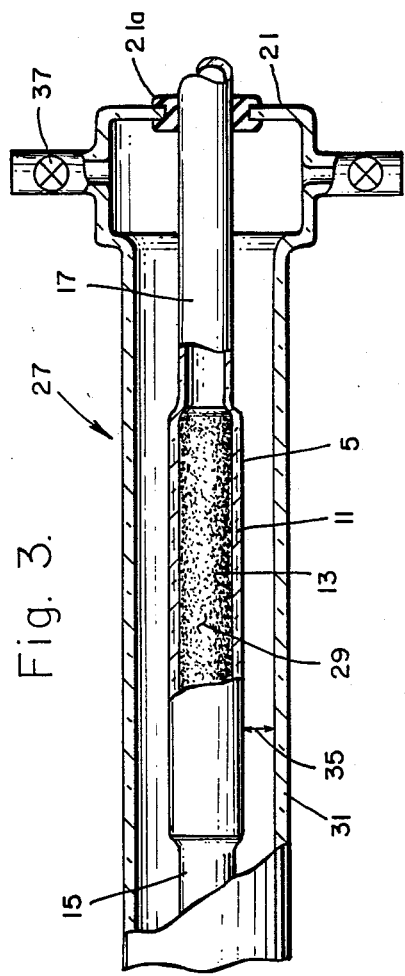

SYNTHESIS OF SIO₂ MEMBRANE ON POROUS SUPPORT AND METHOD OF USE OF SAME

ORIGIN OF INVENTION

The U.S. Government has rights in this invention pursuant to funding provided by NSF Contract No. CBT-8806101.

TECHNICAL FIELD

This invention with relates to thin films and their uses in catalytic processes; it is especially concerned the preparation of $SiO_2$ film on a porous support and the use of the resultant structure to separate hydrogen produced in reactions such as the water-gas shift reaction and the catalytic decomposition of hydrogen sulfide.

BACKGROUND ART

The development of inorganic films or membranes which are selectively permeable to specific gases and are able to withstand the adverse environments encountered in most industrial processes is becoming increasingly important. Such membranes must be stable at high temperatures and resistant to chemical attack to be suitable for use in a combined process involving a catalytic reaction and product separation. Through the use of such selective permeation membranes, the yield of catalytic processes which are currently restricted by thermodynamic equilibrium can be significantly improved.

In U.S. Pat. No. 4,230,463, entitled "Multi-Component Membranes For Gas Separation", there is an overview of the development of membranes for use as separators. It starts with the development of membranes for liquid separation and proceeds to the development of membranes for gas separation, concluding with new multi-component membranes for gas separation. The membranes are all made from organic polymers and are used at temperatures below about 150° C.

Polymeric membranes are unsuitable for high temperature separation as would be required in applications to catalytic processes. Inorganic membranes, on the other hand, can withstand high temperatures as well as oxidizing atmospheres. Both porous and non-porous inorganic membranes have been proposed for gas separations. Microporous membranes (pore size 40 to 50 Å) have been investigated for hydrogen separation with or without simultaneous chemical reaction (see, e.g., Fukuda et al, Ind. Eng. Chem. Fundam., 17, 1978; Kameyama et al, ibid, 20, 97, 1981a; Kameyama et al, Hydrogen Energy Progress, 2, 569, 1981b; Shindo et al, J. Chem. Eng. Japan, 16, 120, 1983; Shindo et al, ibid, 17, 650, 1984; Shindo et al, ibid, 18, 485, 1985; Haraya et al, ibid, 19, 186, 1986a; Haraya et al, ibid, 19, 461, 1986b).

In such microporous membranes, permeation is governed by Knudsen diffusion and the ideal permeability ratio that can be achieved is inversely proportional to the ratio of molecular weights of gases. For example, the ideal permeability ratio for the $H_2$-$N_2$ pair is 3.74. Such ratios are not adequate for application to equilibrium-limited catalytic reactions.

Non-porous membranes are capable of larger selectivity ratios by virtue of the highly specific mechanism of solid state diffusion. Certain metals exhibit selective permeability to hydrogen.

U.K. Patent Application No. 2,190,397, entitled "Production of Aromatics From Alkanes", teaches the catalytic dehydrocyclodimerisation of $C_2$ to $C_6$ alkanes to a mixture of aromatic hydrocarbons and hydrogen. The reactor is fitted with a membrane which is capable of transferring at least a portion of hydrogen in the gaseous reaction products across the membrane and out of the reaction zone. The membrane can be made from the following metals or their alloys: Pd, Ti, Zr, Ni, Co, Fe, Pt, V, Nb, Ta and Ag. The preferred membrane is a palladium-silver alloy (76% Pd/24% Ag w/w).

An article by R. R. McCaffrey et al, entitled "Inorganic Membrane Technology" and published in *Separation Science and Technology* 22 (213), 873–887, 1987, reported that films of poly-bis (trifluoroethoxy) phosphazene are highly permeable to methanol, ethanol, isopropanol, and phenol. The films, however, melted at 238° C.

The McCaffrey et al article also notes that the permeability of tungsten, molybdenum, copper, nickel, iron and alloys of these metals have been studied but in most cases only for the permeation and diffusion of hydrogen and its isotopes, as well as oxygen, nitrogen and in some cases carbon monoxide. It states that palladium and its silver alloys are widely used to purify hydrogen, and silver is quite permeable to oxygen.

The authors also reported deposition films of vanadium and aluminum on a VCR filter gasket assembly to determine adherence, microstructure and He leak-rate, but no results are given other than to note that the films flaked off after exposure to laboratory air over a period of one week.

It appears that the only separation that has been commercially carried out is that of hydrogen by palladium or palladium alloy membranes. The use of noble metals entails considerable cost and may be adversely affected by sulfur poisoning when the gas mixture contains hydrogen sulfide or other sulfur compounds.

Silica glass (main constituent $SiO_2$) is known to be highly selective for permeation by hydrogen V. O. Altemose, 7th Symposium on the Art of Glassblowing, The American Glassblowers Society, Wilmington, Del., 1962 reported data showing that at 500° to 1,000° K., the $H_2$: $O_2$ separation factor is higher than 10,000. The permeability itself, however, is very low, so that a practical separation device would have to consist of an extremely thin film (less than 1 $\mu$m) of $SiO_2$. Production of films of such thickness in a form which is suitable for gas separation has not been reported in the prior literature.

DISCLOSURE OF INVENTION

In this invention, a composite membrane is formed by depositing a thin film of $SiO_2$ within the walls of a porous tube, such as a porous Vycor glass tube. The tube should have pore diameters from about 30 Å to about 1,000 Å, preferably from about 35 Å to about 100 Å. Besides Vycor glass, the support tube could be of other porous materials, such as porous alumina ($Al_2O_3$). For a Vycor support tube, the average pore diameter is preferably about 35 Å to about 45 Å, while for an alumina support tube, the average pore diameter is preferably about 50 Å to about 1,000 Å.

This invention includes a new technique for depositing the $SiO_2$ film within the walls of the support tube in a "sandwich configuration". This deposition is achieved by flowing one reactant ($SiH_4$) inside the support tube, the other ($O_2$) outside the support tube. The reactants diffuse in opposite directions and meet at some intermediate region within the tube wall where the film deposition reaction takes place. This deposition technique will hence forth be called the opposing reactants deposition technique. The thickness of the deposited film varies inversely with the reaction rate. Thus, increasing the temperature and the concentration of the reactants increases the reaction rate and results in thinner films. While the film thickness depends on the individual concentrations of the two reactants, the position of the film in the tube wall depends only on the ratio of the two concentrations. For example, if $SiH_4$ is employed from the inside and $O_2$ from the outside of the tube increasing the $O_2:SiH_4$ concentration ratio will cause the $SiO_2$ film to be deposited nearer the outer surface of the tube wall. The films synthesized by this technique will grow from about 0.02 $\mu$m to about 5 $\mu$m thick. A preferred range is from about 0.05$\mu$m to about 1 $\mu$m.

BRIEF DESCRIPTION OF THE DRAWINGS

FIG. 1 is a side elevation view, partially cut away, of an apparatus for depositing an amorphous $SiO_2$ film within the walls of a porous support tube using the opposing reactant technique.

FIG. 2 is a cross-sectional view of the tube in FIG. 1 along the line 2—2.

FIG. 3 is a schematic diagram, partially cut away, of a catalytic reactor for the water gas shift reaction.

BEST MODES FOR CARRYING OUT THE INVENTION

Figure 4:
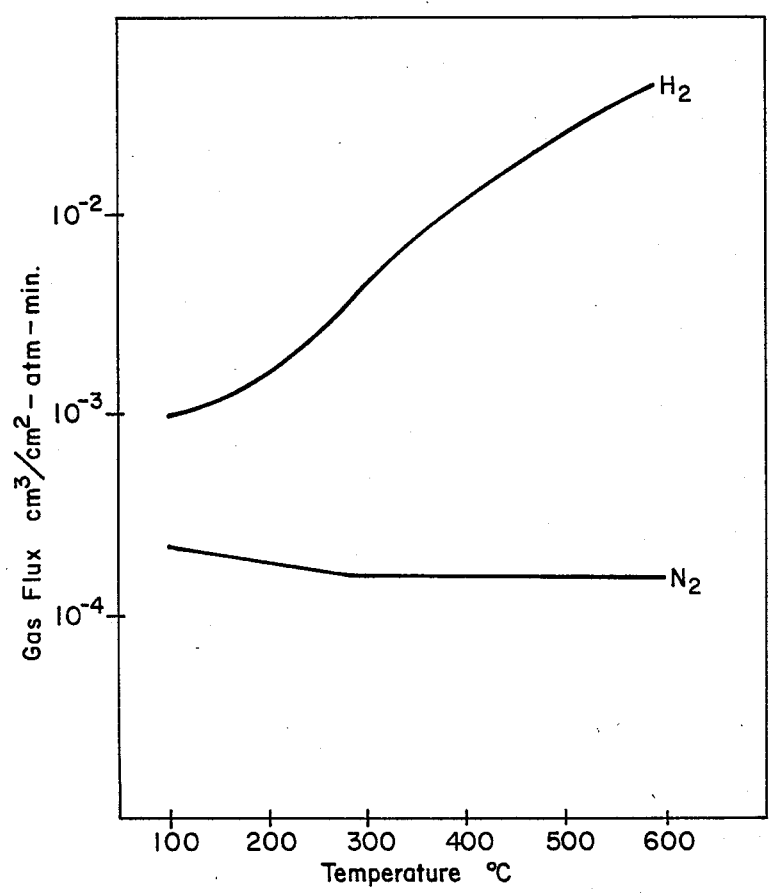
FIG. 4 is a graph showing the fluxes of hydrogen and nitrogen through the $SiO_2$ membrane in the temperature range of 100° to 600° C.

Referring now to the drawings wherein the like numerals of reference designate like elements throughout, FIG. 1 shows generally an apparatus 1 for depositing an amorphous $SiO_2$ film within the walls of porous support tube 5. It has an outer shell 3, which may be made of any non-porous material, an inner porous (support) tube 5, and gas inlets 7 and 9. Support tube 5 in one embodiment consisted of porous Vycor glass, had a 7 mm O.D. and a wall thickness of 1.1 mm; its length was 35 cm. Pores having an average diameter of 40 Å took up about 28% of the tube wall volume. Non-porous Vycor glass tubes 15 and 17 which had 6 mm O.D. were connected to either end of inner tube 5 and in turn were supported at each end 19 and 21 of outer tube 3 by removable fittings 19A and 21A. Outlet 23 of tube 15 can be attached to a vacuum pump (not shown) to facilitate the flow of gases through inner tube 5. Similarly, outlet 25 can be attached to a vacuum pump (not shown) for the same purpose.

A mixture of 10% silane in nitrogen is fed into inner tube 5 through gas inlet 7 and non-porous Vycor tube 17. Similarly, 33% oxygen in nitrogen enters the annular space between outer tube 3 and inner tube 5 through gas inlet 9. Typical flows were 30 cm$^3$/min of $SiH_4/N_2$ and 45 cm$^3$/min of $O_2/N_2$ at 1 atmosphere of pressure.

Apparatus 1 was placed in an electrical furnace (not shown) and held at 450° C. The usual reaction/deposition time was 30 minutes. At the end of this time, film 11 had deposited within the wall of inner (support) tube 5, preventing further contact between the reactants. Later experiments demonstrated that under the aforementioned conditions of temperature and concentration, 15 minutes reaction time was sufficient to form the non-porous film 1. Tube 5 containing the deposited film 11 constitutes the separation membrane. A cross-section of this membrane is shown schematically in FIG. 2.

The flux of hydrogen and nitrogen through this membrane was tested in the temperature range 100° to 600° C. The results are plotted in FIG. 4. The permeability ratio (ratio of $H_2$ to $N_2$) increases from about 4 at 100° C. to about 300 at 600° C. The thickness of the $SiO_2$ film was estimated to be between 0.1 and 0.5 $\mu$m.

The aforementioned conditions of temperature, concentrations, flow rates, and reaction times were found adequate but are not the only ones possible. Changes in any of these parameters, especially temperature and reactant concentrations, could affect the thickness and permeability of the film.

Our experiments have shown that $SiO_2$ film deposited at 450° C. has its best selectivity and permeability properties immediately after deposition. Prolonged exposure to temperatures above 450° C., especially in the presence of water vapor, causes film densification accompanied by decrease in permeability and selectivity. In one experiment, the hydrogen flux at 450° C. immediately after deposition was 18.4 cm$^3$ (STP) /cm$^2$-atm-min while the nitrogen flux was undetectable. After the film was heated for eighteen hours at 600° C., the hydrogen flux decreases to 7 while the nitrogen flux was still undetectable. After two weeks exposure to ambient air and subsequent heating to 600° C. for one day, the flux of hydrogen decreased to 3.9 while that of nitrogen increased to 0.28. Exposure to ambient air for three additional months followed again by heating at 600° C. for one day did not cause any further change.

In FIG. 3, a schematic diagram of a catalytic reactor 27 for the water gas shift reaction is set forth. The reaction chamber is inner tube 5 containing $SiO_2$ film 11 deposited as described above. Inner tube 5 is filled with catalyst 29 such as iron oxide or iron chromium oxide and is mounted in an outer tube 31. A mixture of carbon monoxide and water, as obtained from a coal gasifier, is introduced into inner tube 5 through tube 15.

In accordance with well-known principles, at a temperature of about 300° C., the following reaction takes place:

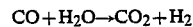

Because inner tube 5 containing the non-porous film 11 is selectively permeable to hydrogen, hydrogen passes out of inner tube 5 into annular space 35 which is maintained at suitably low pressure and eventually exits through gas outlet 37. This selective removal of hydrogen increases substantially the conversion of carbon monoxide. For example, starting with a 2:1 mixture of $H_2O$ and CO at 10 atm. and 500° C., the equilibrium conversion of CO in a conventional reactor (no hydrogen removal) would be 73.4%. Employing the reactor system shown in FIG. 3 with pressure of 10 atm. inside inner tube 5 and 1 atm. in annular space 35 and temperature of 500° C., would yield equilibrium CO conversion of 92.7%.

Another reaction which can benefit by use of the $H_2$ permeable tube is the catalytic dissociation of $H_2S$. Using the reactor system shown in FIG. 3 but replacing the iron oxide catalyst 29 with cobalt sulfide or molybdenum sulfide provides a system for conversion of $H_2S$ to hydrogen and elemental sulfur according to the well-known reaction

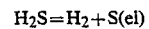

Hydrogen sulfide is introduced through inner tube 5 maintained at a convenient pressure near atmospheric, while hydrogen is removed from annular space 35 maintained at a low pressure such as 0.01 atm. or under the flow of an inert carrier, such as air. Corresponding to these values of the pressures and a temperature of 600° C., the equilibrium H$_2$S conversion is estimated as 15%. By contrast, a conventional reactor (no hydrogen removal) operating at 1 atm. pressure and 600° C. would yield equilibrium conversion of only 2%.

The opposing reactants deposition technique can be used to make thin films of other materials, within a porous substrate sandwich configuration, using gas-phase or liquid phase reactions. Depositing the film within a porous substrate makes it resistant to abrasion, fouling and loss of adhesion.

INDUSTRIAL APPLICABILITY

The membrane disclosed herein is expected to find use in separating hydrogen from gas mixtures at high temperatures.

The foregoing description of an embodiment of the present invention has been presented for purposes of illustration and description. It is not intended to be exhaustive or to limit the invention to the precise form disclosed. Obviously, many modifications and variations will be apparent to practitioners skilled in this art. It is probable that the membrane consisting of the porous tube and SiO$_2$ film can be used to separate hydrogen from other gas mixtures than those set forth. Similarly, any process steps described might be interchangeable with other steps in order to achieve the same result. The embodiment was chosen and described in order to best explain the principles of the invention and its practical application, thereby enabling others skilled in the art to understand the application of the invention to other embodiments and with various modifications as are suited to the particular use contemplated. It is intended that the scope of the invention be defined by the claims appended hereto and their equivalents.

What is claimed is:

1. A method of separating hydrogen from a gaseous mixture comprising passing the mixture into a membrane comprising a porous support tube having a non-porous film of amorphous SiO$_2$ in the pores of said tube, said film having been formed by flowing a first reactant inside said support tube and a second reactant outside said support tube, and causing said reactants to diffuse in opposite directions and meet within said pores.

2. The method of claim 1 wherein the gaseous mixture is produced in said tube by means of the water-gas shift reaction.

3. The method of claim 1 wherein the gaseous mixture is produced in said tube by catalytic dissociation of hydrogen sulfide.

4. A membrane comprising a porous support tube having a non-porous film of amorphous SiO$_2$ in the pores of said tube, said film having been formed by flowing a first reactant inside said support tube and a second reactant outside said support tube, and causing said reactants to diffuse in opposite directions and meet within said pores.

5. The membrane of claim 4 herein the SiO$_2$ film has a thickness from about 0.02 $\mu$m to about 5 $\mu$m.

6. The membrane of claim 5 herein the SiO$_2$ film has a thickness from about 0.05 $\mu$m to about 2 $\mu$m.

7. The membrane of claim 4 wherein the support tube is made of Vycor glass having an average pore diameter of about 35 Å to about 45 Å.

8. The membrane of claim 4 wherein the support tube is made of alumina having an average pore diameter of about 50 Å to about 1,000 Å.

9. A method for depositing a thin film of SiO$_2$ within the porous walls of a support tube comprising passing a first fluid reactant into the support tube and into pores in the support tube, and a second fluid reactant into an annular space on the outside of the support tube and into the pores of said support tube to contact and react with the first reactant, the first reactant and the second reactant being selected to form said thin film of SiO$_2$.

10. The method of claim 9 wherein the two reactants are SiH$_4$ and O$_2$, producing said thin film and said thin film is non-porous and amorphous.

11. The method of claim 10 wherein the film thickness ranges from about 0.02 $\mu$m to about 5 $\mu$m.

12. The method of claim 11 wherein the film thickness is from about 0.05 $\mu$m to about 2 $\mu$m.

13. The method of claim 9 wherein the support tube is made of Vycor glass having an average pore diameter of about 35 Å to about 45 Å.

14. The method of claim 9 wherein the support tube is made of alumina having an average pore diameter of about 50 Å to about 1,000 Å.

* * * * *